United States Patent
Damico (10) Patent No.: US 9,405,283 B1
(45) Date of Patent: Aug. 2, 2016

(54) SENSOR SENTINEL COMPUTING DEVICE

(76) Inventor: Joseph P. Damico, Pacific Grove, CA (US)

(*) Notice: Subject to any disclaimer, the term of this patent is extended or adjusted under 35 U.S.C. 154(b) by 605 days.

(21) Appl. No.: 13/240,948

(22) Filed: Sep. 22, 2011

(51) Int. Cl.
G05B 15/00 (2006.01)
G05B 19/042 (2006.01)
G05B 19/045 (2006.01)
A01G 25/16 (2006.01)

(52) U.S. Cl.
CPC .............. *G05B 19/042* (2013.01); *A01G 25/16* (2013.01); *G05B 19/045* (2013.01); *G05B 19/0426* (2013.01)

(58) Field of Classification Search
CPC ............. G05B 19/042; G05B 19/0426; G05B 19/045; B05B 19/0426; A01G 25/16
USPC .......................................................... 700/14
See application file for complete search history.

(56) References Cited

U.S. PATENT DOCUMENTS

| | | | |
|---|---|---|---|
| 4,975,865 A * | 12/1990 | Carrette et al. .............. | 700/10 |
| 7,346,469 B2 * | 3/2008 | Taware et al. .............. | 702/179 |
| 2003/0071724 A1 * | 4/2003 | D'Amico ............. | G08B 25/008 |
| | | | 340/506 |
| 2003/0109951 A1 * | 6/2003 | Hsiung et al. ................ | 700/108 |
| 2003/0140234 A1 * | 7/2003 | Noda et al. .................... | 713/186 |
| 2005/0102527 A1 | 5/2005 | Tatebayashi et al. | |
| 2005/0216114 A1 * | 9/2005 | Hsiung et al. ................ | 700/108 |
| 2006/0074496 A1 * | 4/2006 | Taware et al. .................. | 700/11 |
| 2006/0224357 A1 | 10/2006 | Taware | |
| 2007/0168674 A1 | 7/2007 | Nonaka et al. | |
| 2007/0300021 A1 | 12/2007 | Boggs et al. | |
| 2008/0052435 A1 * | 2/2008 | Norwood et al. ............ | 710/301 |
| 2008/0276087 A1 * | 11/2008 | Hasegawa ............ | G05B 19/054 |
| | | | 713/168 |
| 2008/0291017 A1 * | 11/2008 | Yermal et al. ................. | 340/541 |
| 2011/0125000 A1 | 5/2011 | Rantala | |

* cited by examiner

*Primary Examiner* — Mohammad Ali
*Assistant Examiner* — Ziaul Karim
(74) *Attorney, Agent, or Firm* — Daniel J. Jenkins (57) ABSTRACT

Technologies pertaining to authenticating data output by sensors in an industrial environment are described herein. A sensor sentinel computing device receives time-series data from a sensor by way of a wireline connection. The sensor sentinel computing device generates a validation signal that is a function of the time-series signal. The sensor sentinel computing device then transmits the validation signal to a programmable logic controller in the industrial environment.

18 Claims, 7 Drawing Sheets

SENSOR SENTINEL COMPUTING DEVICE

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

There are numerous governmental or quasi-governmental agencies that are tasked with ensuring that operators that perform various tasks (companies) comply with international treaties. In an example, the International Atomic Energy Agency (IAEA) is tasked with monitoring uranium processing operations performed by companies in different countries. Accordingly, such governmental or quasi-governmental agencies desirably monitor signals output by sensors that sense operating conditions corresponding to a particular process.

Conventionally, the aforementioned agencies utilize custom equipment to monitor operating parameters of a process. Therefore, for example; such an agency can be provided with access to a particular process site and generate a customized configuration to obtain data from sensors that output signals pertaining to a desirably monitored parameter. Such customized systems include sensors, wiring that runs through a tamper-indicating conduit, a data collection system that is enclosed in a tamper-indicating enclosure, etc. For each sensor, the data collection system typically receives signals output by a sensor, authenticates such signals, signs the signals utilizing a cryptographic algorithm, and causes the combination of the signal from the sensor and the cryptographic signature to be retained in a data repository and/or passed on to another portion of the agency's network.

Oftentimes the company that is performing the process is monitoring at least some of the same parameters that are desirably monitored by the governmental or quasi-governmental agency. The agencies have chosen to utilize these customized systems to reduce the possibility that the operator (company) will attempt to modify sensor data in an attempt to obfuscate the violation of a treaty. From the perspective of the operator, heretofore there has been little reason to authenticate sensor data. In other words, since the operator owns and monitors the facility in which operations are taking place, and further as the operator and owns and monitors the data collection system, the operator heretofore has had little reason to authenticate sensor data.

It can be ascertained that the utilization of customized authentication equipment is costly, and as facilities become increasingly large and complex, can become very difficult to configure. Therefore, there is a cost and time savings incentive from the perspective of the agencies to utilize the equipment of the operator when monitoring operating parameters. This, however, would require the agency to trust the operations configuration put in place by the operator. Furthermore, while in the recent past the operator may have been unconcerned with sensor data authentication, computer viruses have been developed that are configured to attack and modify the operation of industrial automation equipment in general, and programmable logic controllers in particular. Specifically, the Stuxnet virus is a multi-layered virus that is configured to modify behavior of certain programmable logic controllers. Due to such virus and other similar threats, operators are no longer able to inherently trust the actions of programmable logic controllers in their facilities.

SUMMARY

The following is a brief summary of subject matter that is described in greater detail herein. This summary is not intended to be limiting as to the scope of the claims.

Various technologies pertaining to authenticating sensor data in an industrial environment are described herein. An industrial environment comprises a programmable logic controller that is configured to receive signals from a plurality of sensors and control at least one electromechanical process based at least in part upon these signals. The sensors can include any suitable type of sensor, including a temperature sensor, a pressure sensor, a scale, a voltmeter, a flow meter, or any other suitable type of sensor that may be used in an industrial environment.

The industrial environment also includes a sensor sentinel computing device that is configured to receive time-series signals from the sensor. Pursuant to an example, the sensor sentinel computing device can include a plurality of input ports. The plurality of input ports on the sensor sentinel computing device receive the plurality of time-series signals output by the plurality of sensors. Accordingly, a wireline connection exists between each of the plurality of sensors and the sensor sentinel computing device.

The sensor sentinel computing device is configured to generate a validation signal that is a function of at least one of the time-series signals received from at least one of the sensors in the plurality of sensors. In a particular example, the sensor sentinel computing device can be configured to generate an inverse of the at least one time-series signal, and the inverse of such signal can be the validation signal. In another example, the sensor sentinel computing device may be configured with a cryptographic function that is executed over at least one time-series signal, wherein the cryptographic function utilizes a cryptographic key that is retained on the sensor sentinel computing device to generate an encrypted signal. The resultant encrypted signal can then be output by the sensor sentinel computing device as the validation signal. In still yet another example, the validation signal may be based at least in part upon multiple time-series signals received from multiple sensors. For instance, the sensor sentinel computing device can receive a first time-series signal from a first sensor and a second time-series signal from a second sensor. The sensor sentinel computing device can be configured to compute a ratio between these two time-series signals and can output such ratio as the validation signal. Other operations, including summations of signals, subtraction of signals, etc. can also result in the creation of a validation signal that is based at least in part upon time-series signals received from sensors in the industrial environment.

The validation signal can be transmitted via an output port on the sensor sentinel computing device to an input port of the programmable logic controller by way of a wireline connection. The programmable logic controller also receives the plurality of time-series signals from the plurality of sensors and can control an electromechanical process based at least in part upon the time-series signals received from the sensors. The programmable logic controller is also configured to transmit the time-series signals, as well as the validation signal, to another computing device, which can include a database system. There, a technician or computer executable program can perform the operation(s) that were previously performed by the sensor sentinel computing device on the time-series signals, resulting in the creation of another validation signal. The another validation signal can be compared with the validation signal generated by the sensor sentinel computing device, and if the validation signals match, then the time-series signals output by the plurality of sensors can be authenticated. If, however, there are sufficient differences between the two validation signals, then a signal can be generated that indicates to a human that an investigation is desirably conducted as to the authenticity of data output by at least one sensor in the plurality of sensors.

Other aspects will be appreciated upon reading and understanding the attached figures and description.

DETAILED DESCRIPTION

Various technologies pertaining to authenticating time-series signals output by sensors in an industrial environment will now be described with reference to the drawings, where like reference numerals represent like elements throughout. In addition, several functional block diagrams of exemplary systems are illustrated and described herein for purposes of explanation; however, it is to be understood that functionality that is described as being carried out by certain functions may be performed by multiple functions. Additionally, as used herein, the term "exemplary" is intended to mean serving as an illustration or example of something, and is not intended to indicate a preference.

As used herein, the term "function" is intended to encompass computer-readable data storage that is configured with computer-executable instructions that cause certain functionality to be performed when executed by a processor. Further, a "function" may be hardware that is configured to perform certain tasks, such as a field programmable gate array (FPGA), a cluster on chip (CoS) system, or a system on chip (SoC) system. The computer-executable instructions may include a routine, a sub-routine, or the like. It is also to be understood that a function may be localized on a single device or distributed across several devices.

Figure 1:
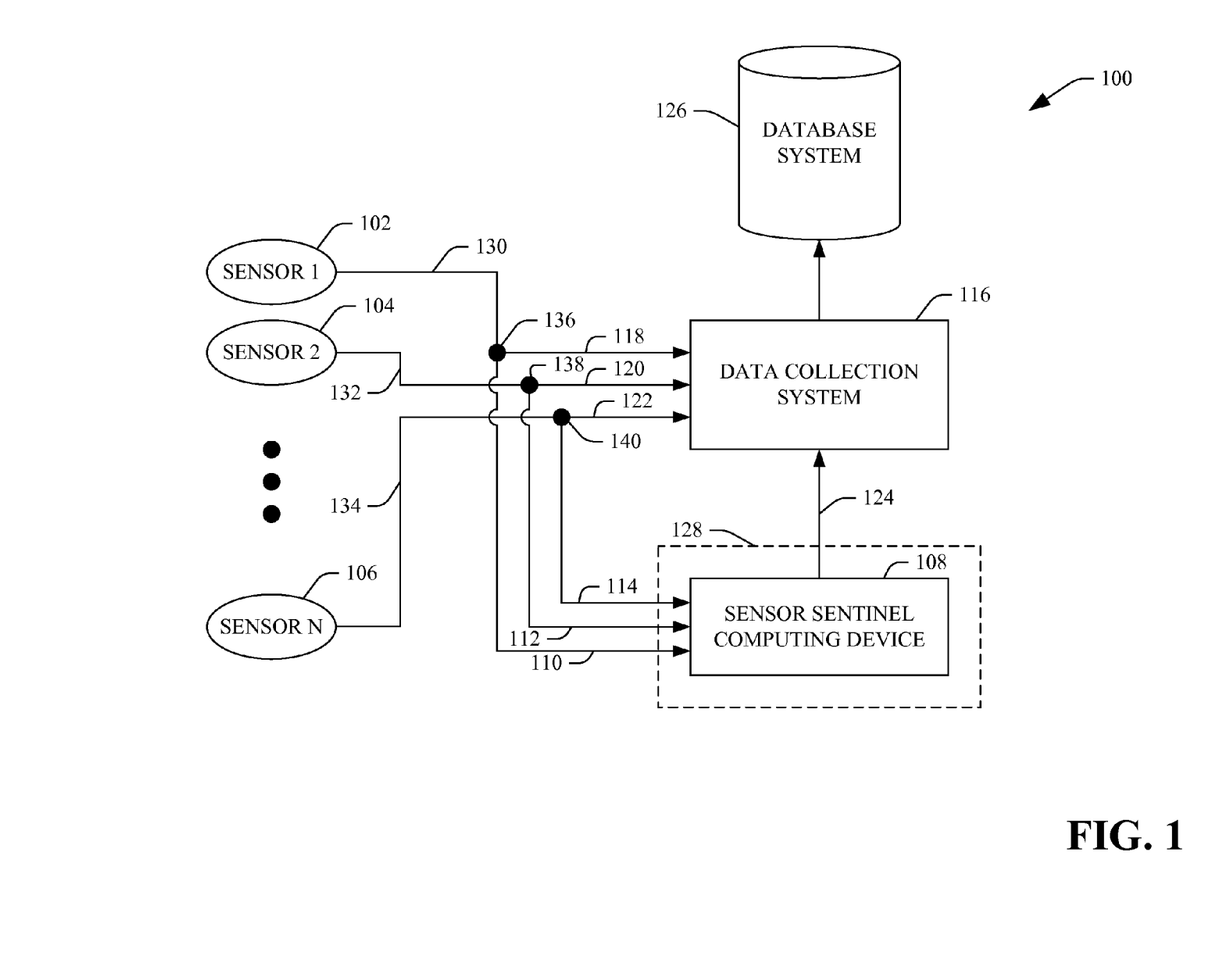
FIG. 1 is a functional block diagram of an exemplary system that facilitates authenticating sensor data in an industrial environment.

With reference now to FIG. 1, an exemplary system 100 that facilitates authenticating time-series signals output by sensors in an industrial environment is illustrated. The system 100 comprises a plurality of sensors 102-106 that are configured to generate time-series signals that are indicative of various operating parameters corresponding to at least one process in an industrial environment. In a particular example, the industrial environment can be a uranium processing environment where industrial automation techniques are employed in connection with enriching uranium or producing nuclear fuels. The sensors 102-106 can be configured to output time-series signals that are indicative of any suitable type of parameter and, therefore, can be a voltmeter, a flow sensor, a thermometer, a rotational velocity sensor, or any other suitable sensor. The sensors 102-106 can have wiring 130-134 exiting therefrom, wherein the wiring 130-134 is configured to transmit data output by the sensors 102-106 to other devices. It is to be understood that the sensors can be analog or digital sensors.

The system 100 further comprises a sensor sentinel computing device 108 that is in wired communication with the plurality of sensors 102-106. That is, the sensor sentinel computing device 108 can include a plurality of input ports (not shown) that receive wiring that is employed to transmit data from the sensors 102-106 to the sensor sentinel computing device 108. First wiring 110 transmits data output by the first sensor 102 to the sensor sentinel computing device 108, second wiring 112 transmits data output by the second sensor 104 to the sensor sentinel computing device 108, and nth wiring 114 transmits data output by the nth sensor 106 to the sensor sentinel computing device 108. Therefore, the sensor sentinel computing device 108 receives the time-series signals output by the plurality of sensors 102-106 by way of the wiring 130 and 110, 132 and 112, and 134 and 114, respectively. Junctions 136-140 act to couple the wiring 130 and 110, 132 and 112, and 134 and 114, respectively.

The sensor sentinel computing device 108 is configured to perform a computing operation on at least one time series signal of the time-series signals output by at least one sensor of the plurality of sensors 102-106 to generate a first validation signal. The first validation signal is a function of the at least one time-series signal received from the at least one sensor. In an example, the computing operation performed by the sensor sentinel computing device 108 on the at least one time-series signal can be an inverse operation, such that the resultant first validation signal is the inverse of the at least one time-series signal. In another exemplary embodiment, the sensor sentinel computing device 108 may have local computer-readable storage thereon that comprises a computer-executable cryptographic function and at least one cryptographic key. The sensor sentinel computing device 108 can execute the cryptographic function over the at least one time-series signal utilizing the cryptographic key to generate an encrypted time-series signal, which can be output as the validation signal. It is to be understood that these computing operations that have been described as being performed by the sensor sentinel computing device 108 are merely exemplary and that one skilled in the art will understand that many different types of computing operations can be performed by the sensor sentinel computing device 108 to generate the first validation signal.

In another exemplary embodiment, the sensor sentinel computing device 108 can receive multiple time-series signals, and the computing operation performed by the sensor sentinel computing device 108 can generate a first validation signal that is a function of the multiple received time-series signals. For instance, the sensor sentinel computing device 108 can receive a first time-series signal from the first sensor 102 and a second time-series signal from the second sensor 104. The sensor sentinel computing device 108 may then compute a ratio of the first time-series signal to the second time-series signal and can output such ratio as the first validation signal. In still yet another example, the sensor sentinel computing device 108 can receive a plurality of time-series signals from the plurality of sensors 102-106 and can perform a summation over these time-series signals. The summation of the plurality of time-series signals may then be output by the sensor sentinel computing device 108 as the validation signal. Again, one skilled in the art will understand that various different types of computing operations can be performed over multiple time-series signals to generate a validation signal that is a function of the multiple time-series signals.

The system 100 can further comprise a data collection system 116 that receives the first validation signal output by the sensor sentinel computing device 108 as well as the plurality of time-series signals generated by the plurality of sensors 102-106. Pursuant to a particular example, the data collection system 116 can be a programmable logic controller that comprises multiple input ports that are configured to receive inputs from multiple data sources by way of multiple wireline connections. A programmable logic controller is a special purpose computing device that is configured to receive time-series data and control an electromechanical process based at least in part upon the received time-series data from multiple different sources. For example, wiring 118-122 can be coupled to input ports of the data collection system 116, and the data collection system 116 can receive data output by the plurality of sensors 102-106 by way of wiring 130 and 118, 132 and 120, and 134 and 122, respectively. Junctions 136, 138, and 140 act to couple the wiring 130 and 118, the wiring 132 and 120, and the wiring 134 and 122, respectively. It can therefore be ascertained that in the exemplary embodiment shown in FIG. 1, the sensor sentinel computing device 108 and the data collection system 116 receive time-series signals output by the plurality of sensors 102-106 in parallel.

The system 100 can further comprise a database system 126 that is in communication with the data collection system 116. The database system 126 receives each of the plurality of time-series signals from the data collection system 116 as well as the first validation signal. These signals can at least be temporarily retained in computer-readable storage of the database system 126. Pursuant to an example, the database system 126 can include computer-executable instructions that cause the database system 126 to perform the computing operation on the time-series signals (indicated as being generated by the plurality of sensors 102-106) received from the data collection system 116 that was previously performed by the sensor sentinel computing device 108. The performance of such computing operation on the time-series signals that are indicated as being generated by the plurality of sensors 102-106 results in the generation of a second validation signal. As can be ascertained, the first validation signal desirably matches the second validation signal. This indicates that the time-series signals generated by the plurality of sensors 102-106 were not modified by the data collection system 116. If, however, the second validation signal does not match the validation signal generated by the sensor sentinel computing device 108, then the database system 126 can be configured to output a signal that warns an individual that the data collection system 116 may be compromised and/or an operator of the data collection system 116 is falsifying sensor data. This signal may cause an e-mail message to be transmitted to the individual, a text message to be transmitted to the individual, or the like. In another example, the signal output by the database system 126, if the first validation signal does not sufficiently match the second validation signal, can cause the industrial process to at least temporarily cease operations.

Additional detail pertaining to the sensor sentinel computing device 108 will now be provided. The sensor sentinel computing device 108 may be enclosed in a tamper-indicating enclosure 128. Accordingly, if a malicious person attempted to gain unauthorized access to the sensor sentinel computing device 108, an overseer of the operation can determine that an attempt has been made to access the sensor sentinel computing device 108 by visually inspecting the tamper-indicating enclosure 128.

Further, the sensor sentinel computing device 108 may have internal computer-readable data storage that can be configured to retain logs pertaining to time-series signals received from the plurality of sensors 102-106 as well as corresponding validation signals. Accordingly, if desired, a technician can gain access to the internal computer-readable data storage, read the logs, and compare such logs to the corresponding time-series signals received at the database system 126. In an example, these logs can be retained in a trusted portion of computer-readable storage in the sensor sentinel computing device 108 that is logically separate from any operating system that may execute on the sensor sentinel computing device 108. For instance, the logs may be retained in a trusted platform module (TPM) residing on the sensor sentinel computing device 108. Similarly, one or more cryptographic keys can be retained in a trusted portion of the sensor sentinel computing device 108, wherein a corresponding key needed to decrypt an encrypted time-series signal may only be known by authorized humans. This key can be retained, for instance, in a TPM resident upon the sensor sentinel computing device 108.

Time-series signals output by sensors in industrial environments are typically analog signals (although some sensors may be configured to output digital signals). Accordingly, pursuant to an example, the sensor sentinel computing device 108 may be an analog computing device that is configured to perform the computing operation directly over analog signals output by a subset of the plurality of sensors 102-106. For example, analog computing devices are particularly advantageously employed when performing functions such as inverses, computing ratios, or the like. Further, since analog computing devices can perform these types of computations at very high speeds, little, if any, synchronization need be undertaken at the data collection system 116 to synchronize the time-series signals received from the plurality of sensors 102-106 and the first validation signal received from the sensor sentinel computing device 108.

In another exemplary embodiment, the sensor sentinel computing device 108 may be a digital computing device. In such an embodiment, and where at least one sensor in the plurality of sensors 102-106 outputs an analog time-series signal, the sensor sentinel computing device 108 can include an analog to digital converter that converts the analog time-series signal received from the at least one sensor to a digital time-series signal. The sensor sentinel computing device 108 can then perform the aforementioned computing operation on the digital representation of the time-series signal to generate the first validation signal. During system initialization, delays caused by performing the computing operation on the time-series signals generated by the plurality of sensors 102-106 can be ascertained, such that the first validation signal generated by the sensor sentinel computing device 108 can be synchronized with the time-series signals output by the plurality of sensors 102-106 at the data collection system 116 and/or the database system 126.

Figure 2:
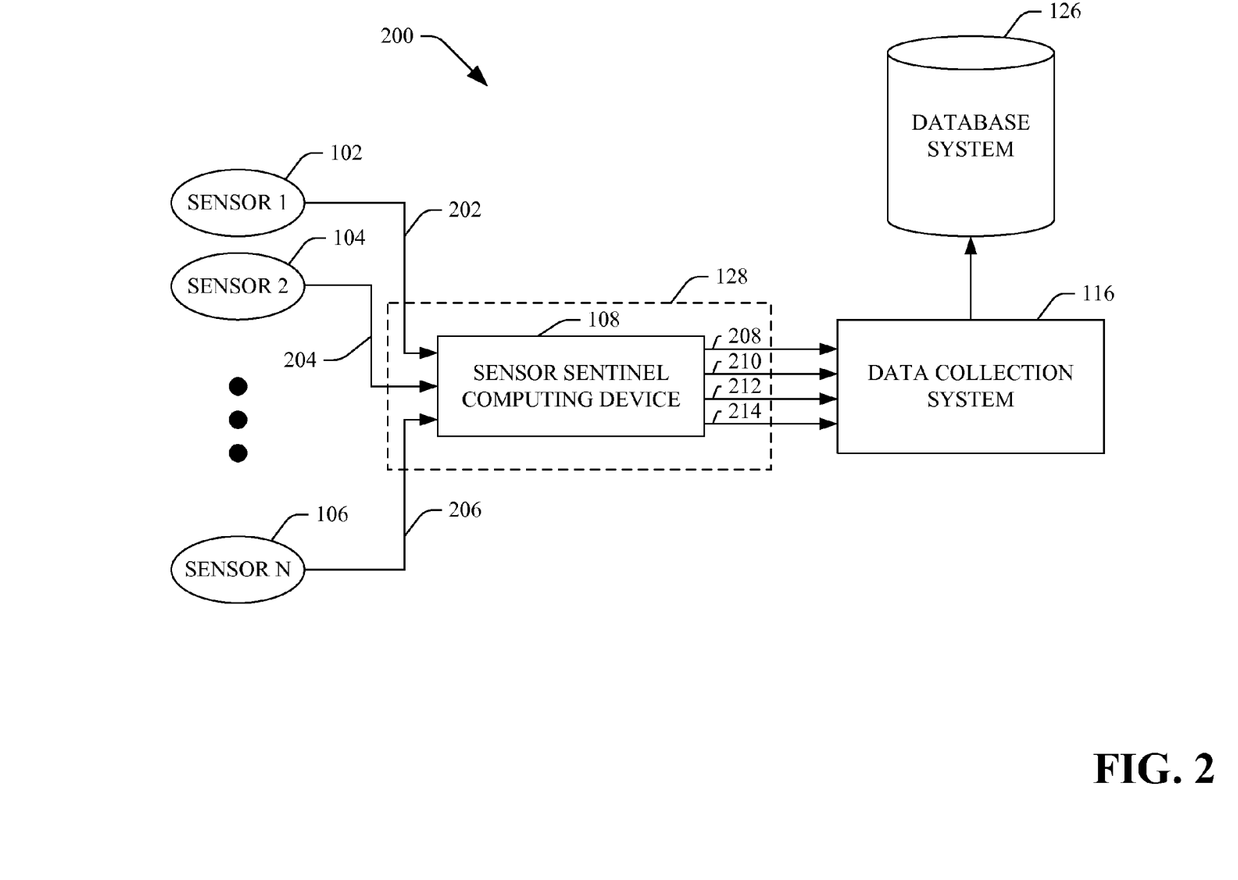
FIG. 2 illustrates an exemplary system that facilitates authenticating time-series signals output by sensors in an industrial environment.

With reference now to FIG. 2, another exemplary system 200 that facilitates authenticating data generated by sensors in an industrial environment is illustrated. The system 200 comprises the plurality of sensors 102-106 that output the plurality of time-series signals. The system 200 further comprises the sensor sentinel computing device 108 that receives the time-series signals from the sensors 102-106 by way of a first plurality of wireline connections 202-206, respectively.

The sensor sentinel computing device 108 performs the computing operation on at least one of the time-series signals received from the sensors 102-106 and generates the first validation signal. The sensor sentinel computing device 108 also causes the time-series signals generated by the sensors 102-106 to be transmitted to the data collection system 116. For example, the sensor sentinel computing device 108 can output the first validation signal to the data collection system 116 by way of first wiring 208. Additionally, the sensor sentinel computing device 108 can output the time-series signals received from the plurality of sensors 102-106 by way of a second plurality of wireline connections 210-214, respectively. Thus, rather than the time-series signals output by the sensors 102-106 being received in parallel by the sensor sentinel computing device 108 and the data collection system 116, the time-series signals output by the sensors 102-106 can first be received by the sensor sentinel computing device 108 and thereafter transmitted to the data collection system 116.

The data collection system 116 can control at least one operating condition of an electromechanical process based at least in part upon the time-series signals output by the plurality of sensors 102-106 and can transmit the time-series signals and the first validation signal to the database system 126, which can act as described above in connection with authenticating the data that is labeled as being generated by the sensors 102-106.

Figure 3:
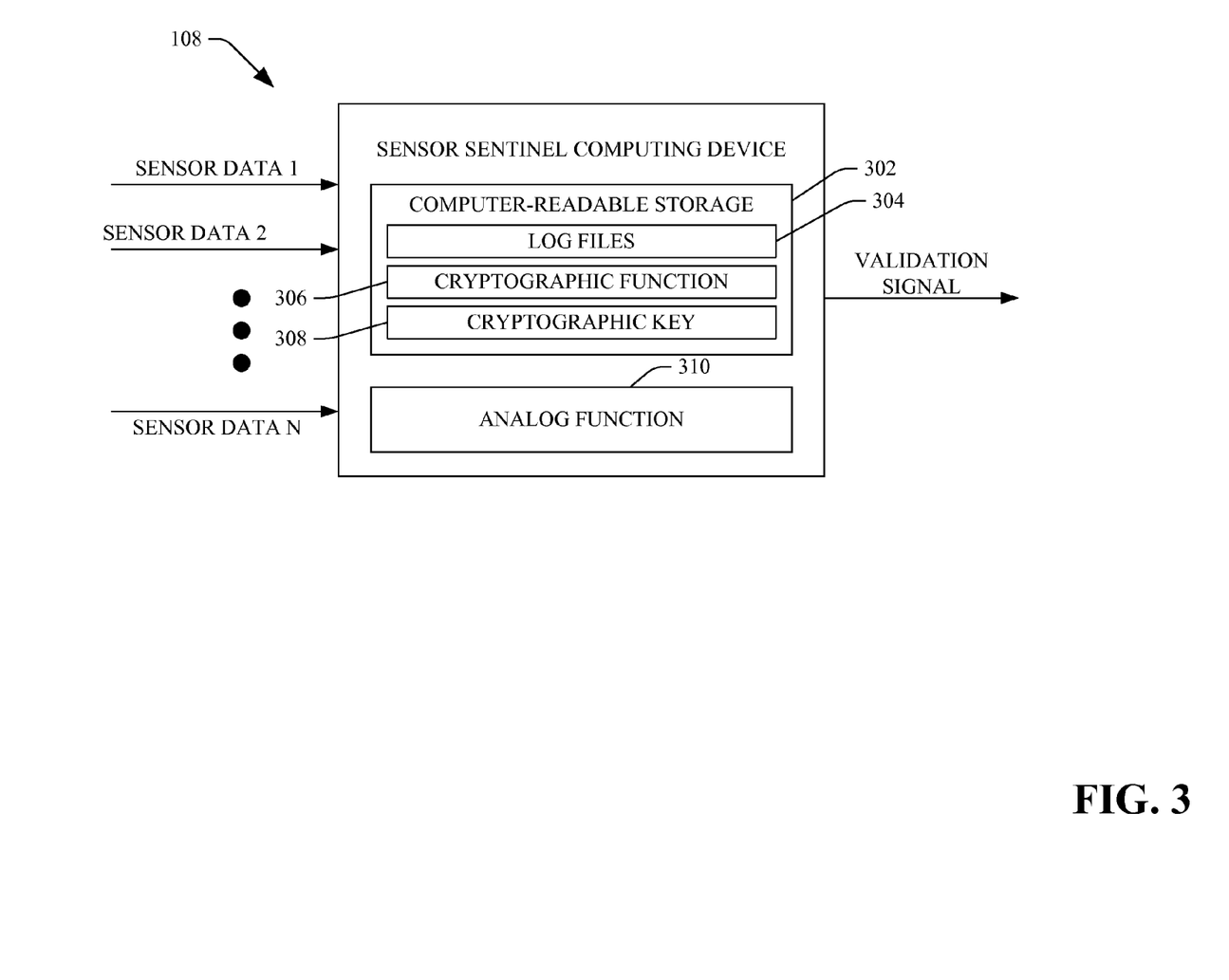
FIG. 3 is a functional block diagram of an exemplary sensor sentinel computing device.

Now referring to FIG. 3, a functional block diagram of the sensor sentinel computing device 108 is illustrated. As indicated above, the sensor sentinel computing device 108 can include computer-readable storage 302. The computer-readable storage 302 can retain log files 304, which comprise at least portions of the plurality of time-series signals received from the plurality of sensors 102-106 and a corresponding portion (in time) of the first validation signal generated by the sensor sentinel computing device 108. In an exemplary embodiment, the computer-readable storage 302 may be in a portion of computer-readable storage that is inaccessible to an operating system installed on the sensor sentinel computing device 108, such as, but not limited to, a trusted platform module. If there is a concern that the data collection system 116 and/or the database system 126 has been compromised, the log files 304 in the computer-readable storage 302 can be accessed and compared with corresponding portions of the time-series signals labeled as being generated by the sensors 102-106 and the first validation signal in the database system 126.

The computer-readable storage 302 may be memory that comprises a cryptographic function 306 that is executed over at least one of the time-series signals received from at least one of the sensors 102-106. The cryptographic function 306 can be employed to generate an encrypted signal through utilization of at least one cryptographic key 308 that is retained in the computer readable storage 302.

Additionally, as mentioned above, the sensor sentinel computing device 108 can be an analog computing device and can, therefore, include an analog function 310. The analog function 310 can be implemented as a particular type of circuit, such as an FPGA or the like.

Figure 4:
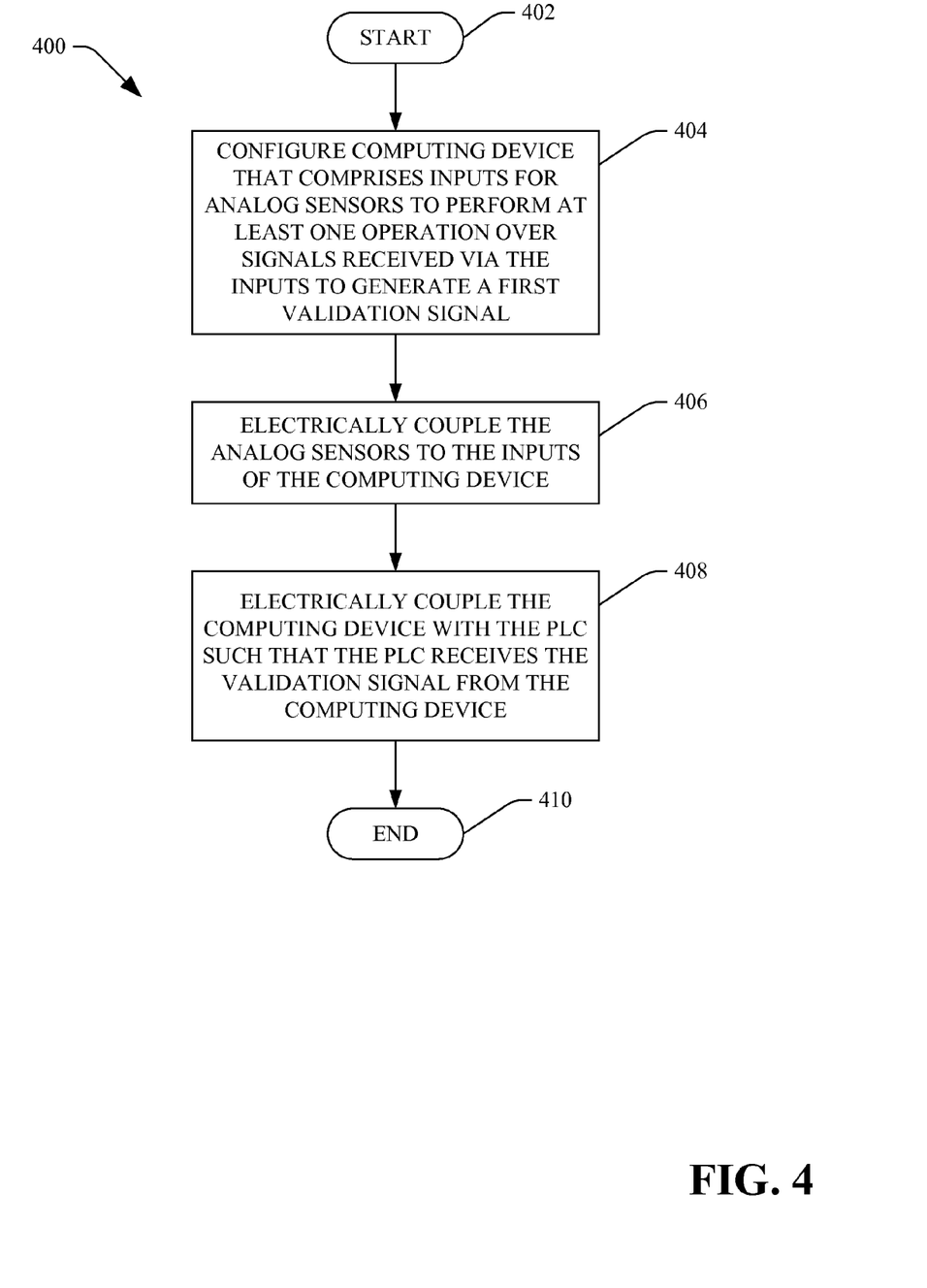
FIG. 4 is a flow diagram that illustrates an exemplary methodology for configuring a system to authenticate sensor data.
Figure 5:
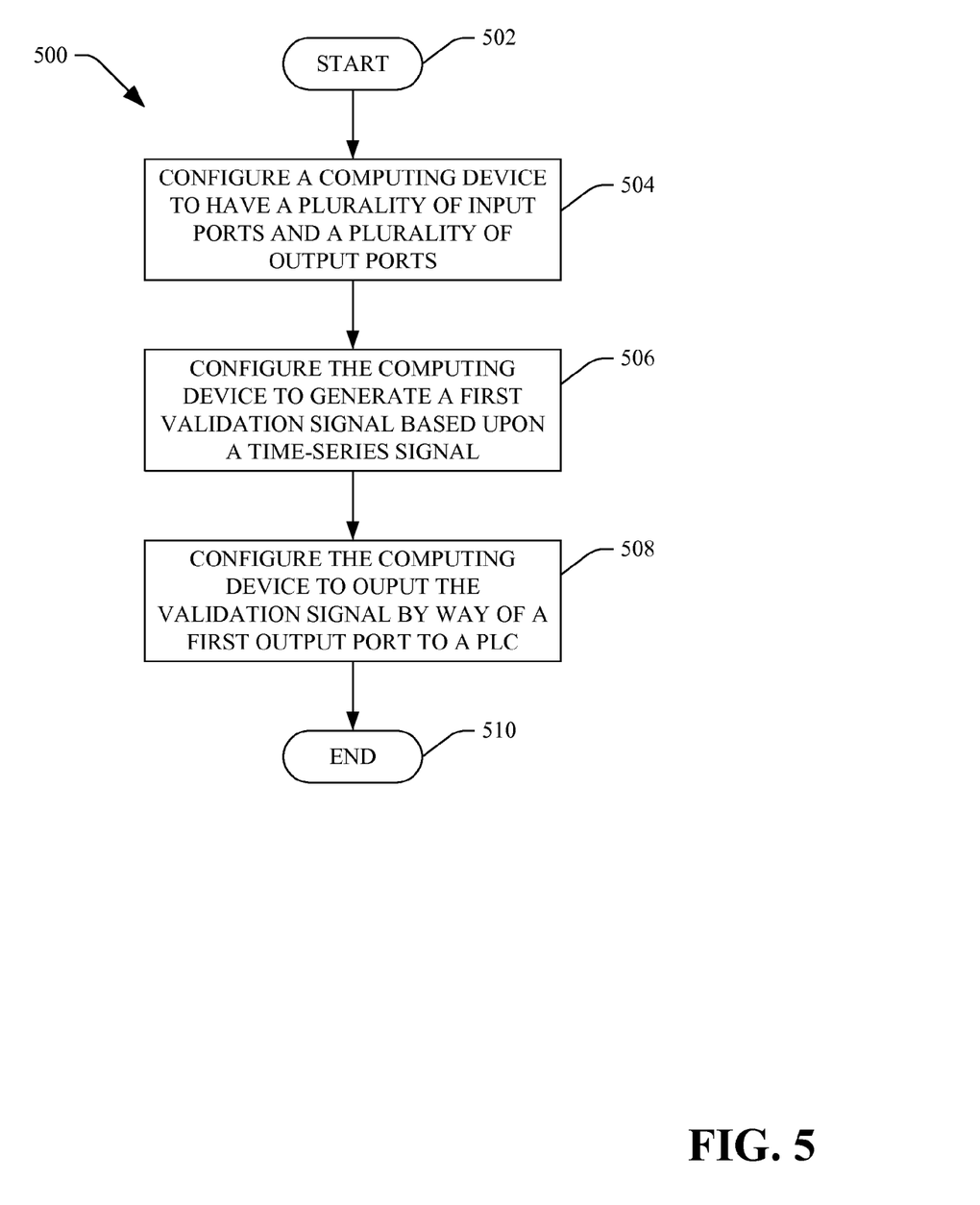
FIG. 5 is a flow diagram that illustrates an exemplary methodology for authenticating sensor data in an industrial environment.
Figure 6:
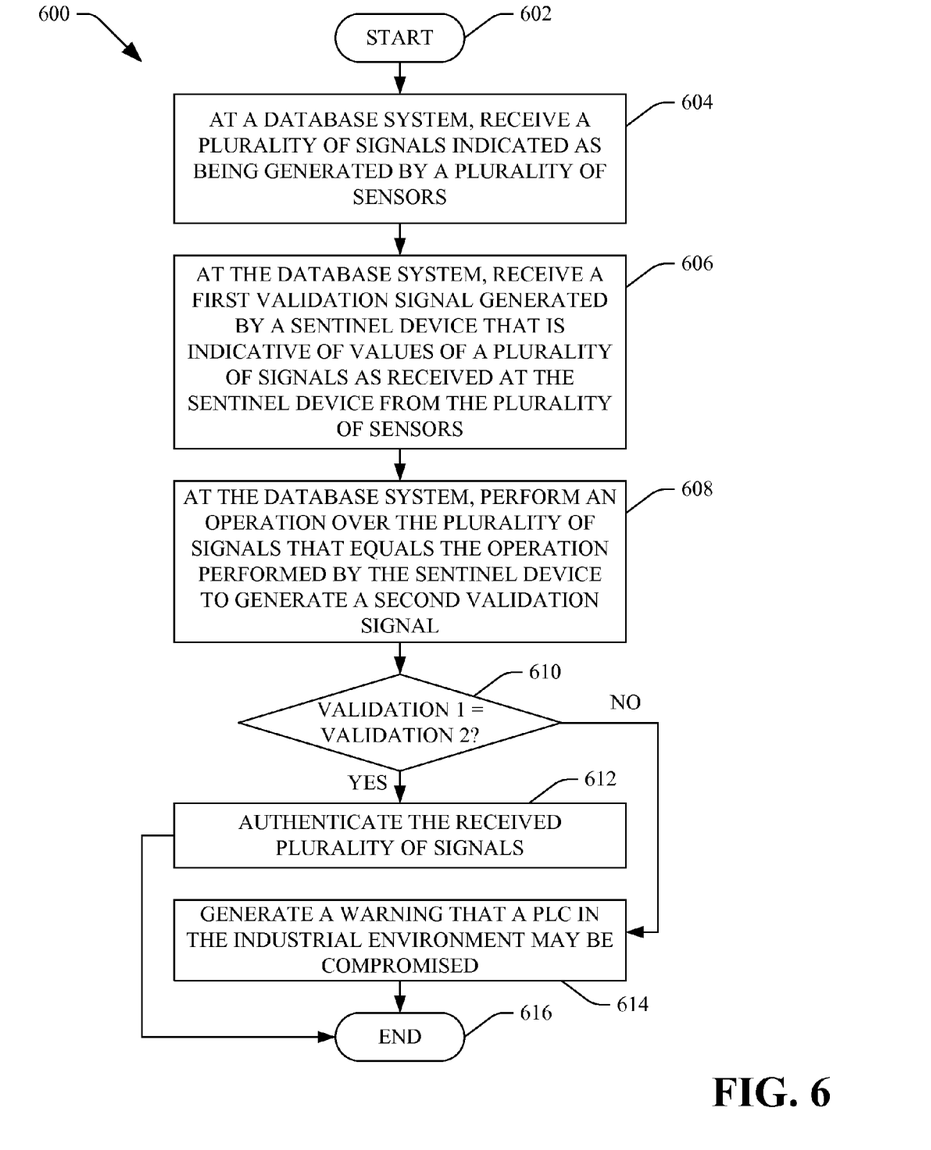
FIG. 6 is a flow diagram illustrating an exemplary methodology for authenticating sensor data in an industrial environment by way of comparing validation signals.

With reference now to FIGS. 4-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 4, an exemplary methodology 400 that facilitates validating sensor data in an industrial environment is illustrated. The methodology 400 starts at 402, and at 404 a computing device that comprises a plurality of inputs for receiving time-series signals from analog sensors is configured to perform at least one computing operation over time-series signals received via the inputs to generate a first validation signal.

At 406, the analog sensors are electrically coupled to the inputs of the computing device. At 408, the computing device is electrically coupled with a PLC, such that the PLC receives the first validation signal from the computing device. The methodology 400 completes at 410.

Now referring to FIG. 5, an exemplary methodology 500 that facilitates configuring a sensor sentinel computing device is illustrated. The methodology 500 starts at 502, and at 504 a computing device is configured to comprise a plurality of input ports and a plurality of output ports. The plurality of input ports are configured to receive a plurality of time-series signals from a corresponding plurality of sensors in an industrial environment by way of a plurality of wireline connections.

At 506, the computing device is configured to generate a first validation signal based at least in part upon at least one time-series signal in the plurality of time-series signals. It is to be understood that the first validation signal is non-identical to the at least one time-series signal.

At 508, the computing device is configured to output the first validation signal by way of a first output port amongst the plurality of output ports to a programmable logic controller over a wireline connection. Additionally, the computing device can optionally be configured to pass the plurality of time-series signals to the programmable logic controller by way of at least a subset of the plurality of output ports of the computing device. The methodology 500 completes at 510.

Turning now to FIG. 6, an exemplary methodology 600 that facilitates authenticating data output by sensors in an industrial environment is illustrated. The methodology 600 starts at 602, and at 604 at a database system, a plurality of signals that are labeled as being from a plurality of sensors in the industrial environment are received. These signals are time-series signals and can be analog or digital.

At 606, at the database system, a first validation signal generated by a sensor sentinel computing device is received. As described above, the first validation signal is indicative of values of a plurality of time-series signals as received at the sensor sentinel computing device from the plurality of sensors (prior to the time-series signals being received and/or processed by the PLC).

At 608, at the database system, an operation is performed over the plurality of time-series signals, wherein the operation is the same operation performed by the sensor sentinel computing device over the time-series signals received at the sensor sentinel computing device to generate the first validation signal. This results in the generation of a second validation signal.

At 610, a determination is made regarding whether the first validation signal generated by the sensor sentinel computing device is equivalent to the second validation signal generated by the database system. If the first validation signal and the second validation signal are found to be equivalent, then the methodology 600 proceeds to 612 where the received plurality of signals are authenticated. If, however, the first validation signal does not sufficiently match the second validation signal, then the methodology proceeds to 614, where a warning is generated that a PLC in the industrial environment may be compromised. The methodology 600 then completes at 616.

Figure 7:
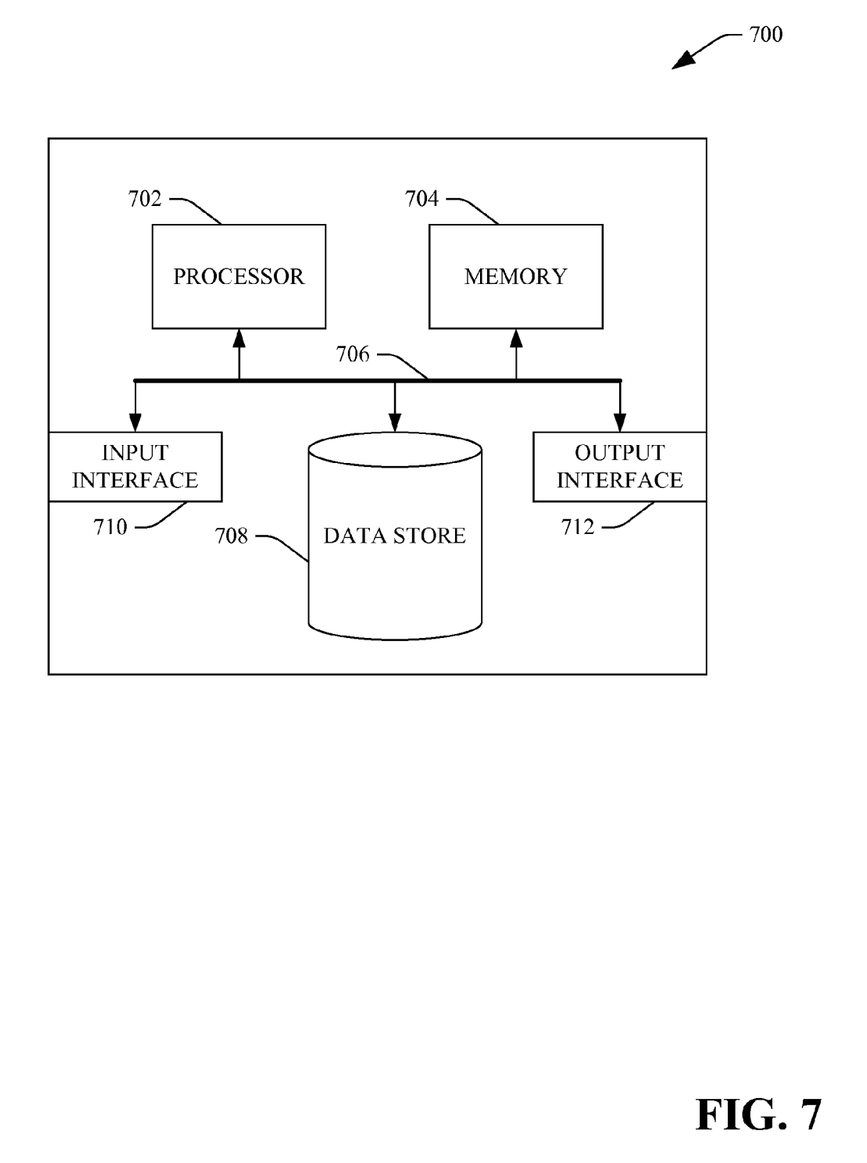
FIG. 7 is an exemplary computing system.

Now referring to FIG. 7, a high-level illustration of an exemplary computing device 700 that can be used in accordance with the systems and methodologies disclosed herein is illustrated. For instance, the computing device 700 may be used in a system that supports generating a first validation signal that is a function of at least one time-series signal received from a sensor. In another example, at least a portion of the computing device 700 may be used in a system that supports comparing validation signals. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store log files, time-series signals, validation signals, cryptographic keys, etc.

The computing device 700 additionally includes a data store 708 that is accessible by the processor 702 by way of the system bus 706. The data store may be or include any suitable computer-readable storage, including a hard disk, memory, etc. The data store 708 may include executable instructions, log files, validation signals, etc. The computing device 700 also includes an input interface 710 that allows external devices to communicate with the computing device 700. For instance, the input interface 710 may be used to receive instructions from an external computer device, a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system, comprising:
   a sensor that is configured to output a first time-series signal that is indicative of a parameter of an operating condition of a process in an industrial environment;
   a sensor sentinel computing device that is in wired communication with the sensor and receives the first time-series signal, the sensor sentinel computing device performing a computing operation on the first time-series signal to generate a first validation signal that is a function of the first time-series signal; and
   a programmable logic controller that is in wired communication with the sensor sentinel computing device, the programmable logic controller comprising:
      a first input port that receives the first time-series signal from one of the sensor or the sensor sentinel computing device; and
      a second input port that receives the first validation signal from the sensor sentinel computing device,
      the programmable logic controller comprising control logic that receives the first time-series signal as an input and generates a second validation signal from the first time-series signal and compares the first validation signal to the second validation signal to determine validation;
   the system further comprising:
   a database system that receives the first time-series signal and the first validation signal from the programmable logic controller and causes the first time-series signal and the first validation signal to be retained in relation to one another in a non-transitory computer-readable data storage in a database;
   wherein validation indicates if the first time-series signal stored in the database has been be altered; and
   wherein the comparison signal causes a message to be delivered to an operator if the comparison indicates that the second validation signal fails to match the first validation signal.

2. The system of claim 1, the system comprising a plurality of sensors that are configured to output a corresponding plurality of time-series signals that are respectively indicative of different parameters of operating conditions of the process in the industrial automation environment, the sensor sentinel computing device being in wired communication with each of the plurality of sensors, the sensor sentinel computing device performing the computing operation over the plurality of time-series signals such that the first validation signal is a function of each of the plurality of time-series signals, and wherein the programmable logic controller comprises a plurality of input ports that receive the plurality of time-series signals from one of the plurality of sensors or the sensor sentinel computing device.

3. The system of claim 1, the database system configured with executable instructions that cause the database system to perform the computing operation on the first-time series signal in the a non-transitory computer-readable data storage to generate a second validation signal, the executable instructions further cause the database system to perform a comparison between the first validation signal and the second validation signal and outputs the comparison signal with a value that is based at least in part upon the comparison.

4. The system of claim 1, further comprising a tamper-indicating enclosure that encloses the sensor sentinel computing device.

5. The system of claim 1, the sensor sentinel computing device being an analog computer.

6. The system of claim 5, wherein the computing operation is an inverse operation, the first validation signal being an inverse of the first time-series signal.

7. The system of claim 5, wherein the system comprises a second sensor that outputs a second time-series signal, the sensor sentinel computing device receiving the second-time series signal, and wherein the computing operation is a division operation such that the first validation signal is a ratio of the first time-series signal to the second time-series signal.

8. The system of claim 1, wherein the programmable logic controller receives the first time-series signal from the sensor sentinel computing device.

9. The system of claim 1, wherein the programmable logic controller is in wired communication with the sensor and wherein the programmable logic controller receives the first time-series signal directly from the sensor.

10. The system of claim 1, wherein the sensor sentinel computing device comprises a non-transitory computer-readable data storage, the sensor sentinel computing device configured to log at least a portion of the first time-series signal and at least a corresponding portion of the first validation signal in the computer-readable data storage.

11. The system of claim 1, wherein the computing operation is an encryption operation that generates the first validation signal by executing a cryptographic function over the first time-series signal utilizing at least one cryptographic key that is retained in a non-transitory computer-readable storage of the sensor sentinel computing device.

12. The system of claim 11, wherein the sensor sentinel computing device comprises a trusted platform module, and wherein the cryptographic function and cryptographic key reside on the trusted platform module.

13. A method, comprising:
configuring a computing device to have a plurality of input ports and a plurality of output ports, the plurality of input ports configured to receive a plurality of time-series signals from a corresponding plurality sensors in an industrial environment by way of a plurality of wired electric connections;
configuring the computing device to generate a first validation signal that is based at least in part upon at least one time-series signal in the plurality of time-series signals, the first validation signal being non-identical to the at least one time-series signal;
configuring the computing device to output the first validation signal by way of a first output port amongst the plurality of output ports to a programmable logic controller over a wireline connection; and
storing the at least one time-series signal in a database;
wherein the programmable logic controller generates a second validation signal from at least one of the plurality of time-series signals and compares the first and second validation signals and outputs a validation result;
wherein the validation result indicates if the at least one time-series signal stored in the database has been be altered;
wherein the database receives the first time-series signal and the first validation signal from the programmable logic controller and causes the first time-series signal and the first validation signal to be retained in relation to one another in a non-transitory computer-readable data storage in the database; and
wherein the comparison signal causes a message to be delivered to an operator if the comparison indicates that the second validation signal fails to match the first validation signal.

14. The method of claim 13, further comprising configuring the computing device to output the at least one time-series signal to the programmable logic control by way of a second output port amongst the plurality of output ports.

15. The method of claim 13, the computing device being an analog computing device.

16. The method of claim 13, wherein the validation signal is based at least in part upon each of the plurality of time-series signals in combination.

17. The method of claim 16, further comprising configuring the computing device to retain logs of the plurality of time-series signals and the first validation signal in computer-readable storage of the computing device.

18. A non-transitory computer-readable medium comprising instructions that, when executed by a processor, cause the processor to perform acts comprising:
receiving a plurality of analog time-series signals from a plurality of sensors in an industrial environment by way of a plurality of wireline connections;
causing an analog to digital converter to convert the plurality of analog time-series signals into a plurality of digital time-series signals;
executing a cryptographic algorithm over at least one digital time-series signal in the plurality of digital time-series signals to generate an encrypted time-series signal;
generating a first validation signal that is based at least in part upon the encrypted time-series signal;
storing the encrypted time-series signal in a database; and
causing the first validation signal to be transmitted together with the at least one digital time-series signal to a programmable logic controller by way of two different output ports, where the programmable logic controller compares the first validation signal to a second validation signal generated from the at least one digital time-series signal and outputs a validation result for the first time-series signal;
wherein the validation result indicates if the encrypted time-series signal has been be altered in the database; and
wherein the database receives the first time-series signal and the first validation signal from the programmable logic controller and causes the first time-series signal and the first validation signal to be retained in relation to one another in a non-transitory computer-readable data storage in the database; and
wherein the comparison signal causes a message to be delivered to an operator if the comparison indicates that the second validation signal fails to match the first validation signal.

* * * * *